(12) United States Patent
Sayed et al.

(10) Patent No.: US 12,456,484 B1
(45) Date of Patent: Oct. 28, 2025

(54) TAPERED OPTICAL AND MAGNETIC ELEMENTS FOR IMPROVED WRITING IN HEAT-ASSISTED MAGNETIC RECORDING

(71) Applicant: Headway Technologies, Inc., Milpitas, CA (US)

(72) Inventors: Shehrin Sayed, Fremont, CA (US); Hong Guo, Fremont, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/979,363

(22) Filed: Dec. 12, 2024

(51) Int. Cl.
  *G11B 5/00* (2006.01)
  *G11B 5/31* (2006.01)
  *G11B 5/48* (2006.01)

(52) U.S. Cl.
  CPC ............. *G11B 5/31* (2013.01); *G11B 5/4866* (2013.01); *G11B 2005/0021* (2013.01)

(58) Field of Classification Search
  CPC .................. G11B 5/314; G11B 5/6088; G11B 2005/0021; G11B 5/3133; G11B 5/3188; G11B 5/09
  USPC .......................................................... 360/59
  See application file for complete search history.

(56) References Cited

U.S. PATENT DOCUMENTS

| | | |
|---|---|---|
| 10,748,572 B1 | 8/2020 | Yang et al. |
| 10,839,830 B1 | 11/2020 | Peng et al. |
| 10,916,263 B1 | 2/2021 | Truong et al. |
| 11,574,647 B1 * | 2/2023 | Yu .................. G11B 5/6088 |
| 11,651,791 B2 | 5/2023 | Matsumoto et al. |
| 11,657,844 B1 | 5/2023 | Lee et al. |
| 2022/0220795 A1 | 7/2022 | Chen et al. |

OTHER PUBLICATIONS

Reinsel, D. et al., "Data Age 2025, The Digitization of the World—From Edge to Core", IDC White Paper, U.S. Appl. No. 44/413,318, filed Nov. 2018.

* cited by examiner

*Primary Examiner* — Nabil Z Hindi
(74) *Attorney, Agent, or Firm* — DLA Piper LLP (US)

(57) ABSTRACT

Writer head products for heat-assisted magnetic recording devices and methods of making the same are disclosed. The writer heads include multiple layers including a waveguide blocking layer, a waveguide layer, a near-field transducer layer, a heat sink layer, and a peg layer. Each of the layers may comprise a tapered angle near an air-bearing surface. The writer heads further include a main magnetic pole adjacent to the optical component including the same tapered angle near the air-bearing surface.

29 Claims, 7 Drawing Sheets

TAPERED OPTICAL AND MAGNETIC ELEMENTS FOR IMPROVED WRITING IN HEAT-ASSISTED MAGNETIC RECORDING

FIELD

The disclosure relates to a high-performance heat-assisted magnetic recording (HAMR) writer head and methods for making the HAMR writer head, for example, as used in hard disk drives (HDDs).

BACKGROUND

A magnetic writer head is an important component of HDD, which transforms an electric current in a coil into a strong magnetic field that is applied on a media platter for efficient and high-density information writing. An increased areal density capacity (ADC) is needed for HDD as HDD technology progresses. One method of increasing the ADC, or the amount of data per square inch, is by decreasing the grain size of the media platter.

The growth in ADC largely depends on the shrinking media bits and shrinking write head structures to match the smaller grains. A larger coercive field for the media grains is required to maintain the stability of the electronic bits on the media when grain sizes are shrinking. However, limitations arise due to the degraded magnetic performance in shrinking writer heads operating at GHz frequencies.

The write heads used in perpendicular magnetic recording (PMR) use a main pole (MP) to apply a perpendicular field to the media bits; however, the writability substantially degrades as the dimensions are scaled down, especially when the grains on the media become smaller with larger coercivities. Heat-assisted magnetic recording (HAMR) and microwave-assisted magnetic recording (MAMR) technologies use an energy source (from heat and microwave, respectively) to make the media temporarily softer so that the magnetic field from a scaled-down write head is sufficient for efficient write operations.

Heat-assisted magnetic recording (HAMR) technology provides the pathways to substantially increase the amount of data that can be stored on an HDD. A HAMR write head consists of a small laser diode that can temporarily transfer heat to tiny grains on the media platter to reduce the switching field and a magnetic writer element that applies magnetic flux to the heated media grains and writes information. Sharp thermal gradients, which translate into high magnetic gradients on the media, enable a higher data storage density than achievable with the legacy perpendicular magnetic recording technology. There exists a need for improvement in writer-head technology.

SUMMARY

In some aspects, the techniques described herein relate to a writer head for a heat-assisted magnetic recording (HAMR) device, the writer head including: an optical component including a triangular layer having a tapered edge and a waveguide (WG) layer positioned adjacent to the triangular layer, the WG layer including a flat section and a tapered section, the tapered section including a tapered angle and contacting the tapered edge of the triangular layer; a cladding layer positioned adjacent to the WG layer; a near field transducer (NFT) layer positioned adjacent to the cladding layer, the NFT layer including a tapered section that includes the tapered angle; a heat sink layer positioned adjacent to the NFT layer; and a peg layer positioned adjacent to the heat sink layer and including an insulator and a tapered section including the tapered angle; and a magnetic component that includes a magnetic main pole having a first tapered section including the tapered angle, a main pole section substantially parallel to the flat section of the WG layer, and wherein the magnetic main pole has a saturation magnetization of about 24 kG or greater.

In some aspects, the techniques described herein relate to a writer head, wherein the tapered angle is about 20 degrees to about 70 degrees.

In some aspects, the techniques described herein relate to a writer head, wherein the triangular layer includes a waveguide blocking layer including ruthenium.

In some aspects, the techniques described herein relate to a writer head, wherein the triangular layer includes one or more of alumina or silica.

In some aspects, the techniques described herein relate to a writer head, wherein the NFT layer includes a first NFT layer includes a first metal and a second NFT layer that includes a transition metal, wherein the first NFT layer includes one or more of gold, silver, copper, alloys thereof, graphene, and a metal oxide; and wherein the second NFT layer includes one of Rh or Ir.

In some aspects, the techniques described herein relate to a writer head, wherein the heat sink layer includes one or more of gold, ruthenium, aluminum nitride, or silicon carbide.

In some aspects, the techniques described herein relate to a writer head, wherein the optical component further includes a first oxide layer positioned between the NFT layer and the heat sink layer.

In some aspects, the techniques described herein relate to a writer head, wherein the tapered section of the main magnetic pole includes the tapered angle.

In some aspects, the techniques described herein relate to a writer head, wherein the first tapered section of the main magnetic pole has a thickness of about 20 nm to about 100 nm.

In some aspects, the techniques described herein relate to a writer head, wherein the ratio of the thickness of the first tapered section of the main magnetic pole to an average grain diameter of a recording media is about 1.4 to about 14.

In some aspects, the techniques described herein relate to a writer head, wherein the main pole section has a thickness of about 200 nm to about 600 nm.

In some aspects, the techniques described herein relate to a writer head, wherein the ratio of the thickness of the main pole section of the main magnetic pole to an average grain diameter of a recording media is about 29 to about 86.

In some aspects, the techniques described herein relate to a writer head, wherein the main magnetic pole includes a second tapered section including the same tapered angle as the first tapered section.

In some aspects, the techniques described herein relate to a writer head, wherein the second tapered section of the main magnetic pole has a thickness of about 20 nm to about 100 nm.

In some aspects, the techniques described herein relate to a writer head, wherein the ratio of the thickness of the second tapered section of the main magnetic pole to an average grain diameter of a recording media is about 1.4 to about 14.

In some aspects, the techniques described herein relate to a writer head, wherein the optical component further includes a laser diode configured to generate a beam of light.

In some aspects, the techniques described herein relate to a writer head, wherein the magnetic component includes a first return pole operably connected to the main magnetic pole by a first connector and positioned on a side of the main magnetic pole opposite of the optical component.

In some aspects, the techniques described herein relate to a writer head, wherein the distance between the first return pole and the main magnetic pole is about 50 nm to about 1,000 nm.

In some aspects, the techniques described herein relate to a writer head, wherein the first return pole has a thickness of about 500 nm to about 1,500 nm.

In some aspects, the techniques described herein relate to a writer head, wherein the first return pole includes a first pedestal with a thickness of about 1.5 µm to about 2.5 µm and a height of about 200 nm to about 1,000 nm.

In some aspects, the techniques described herein relate to a writer head, wherein the first return pole further includes a first magnetic leading shield (MLS) including a thickness of about 100 nm to about 1,000 nm and a height of about 500 nm to about 2,000 nm.

In some aspects, the techniques described herein relate to a writer head, wherein the magnetic component includes a first yoke positioned between the first connector and the main magnetic pole.

In some aspects, the techniques described herein relate to a writer head, wherein the magnetic component includes a second return pole operably connected to the main magnetic pole by a second connector and positioned on a side of the main magnetic pole opposite of the first return pole.

In some aspects, the techniques described herein relate to a writer head, wherein the distance between the second return pole and the main magnetic pole is about 100 nm to about 2,000 nm.

In some aspects, the techniques described herein relate to a writer head, wherein the second return pole has a thickness of about 100 nm to about 1,500 nm.

In some aspects, the techniques described herein relate to a writer head, wherein the second return pole includes a second pedestal with a thickness of about 1.5 µm to about 2.5 µm and a height of about 200 nm to about 1,000 nm.

In some aspects, the techniques described herein relate to a writer head, wherein the second return pole further includes a second magnetic leading shield (MLS) including a thickness of about 100 nm to about 800 nm and a height of about 500 nm to about 1,000 nm.

In some aspects, the techniques described herein relate to a writer head, wherein the magnetic component further includes a coil including between 0 and 6 loops, wherein the coil is positioned between the first return pole and the main magnetic pole.

In some aspects, the techniques described herein relate to a writer head, wherein the magnetic component further includes a first coil and a second coil, wherein the first coil and the second coil combined include between 0 and 6 loops, wherein the first coil is positioned between the first return pole and the main magnetic pole, wherein the second coil is positioned between the second return pole and the main magnetic pole, and wherein the first coil and the second coil include the same number of loops.

DETAILED DESCRIPTION

This disclosure is not limited to the systems, devices, and methods described, as they may vary. The terminology used in the description is to describe the particular versions or embodiments only and is not intended to limit the scope.
Products Heat-assisted magnetic recording (HAMR) writer heads may be assembled to assist in writing data on recording media. In some embodiments, the writer head comprises an optical component and a magnetic component. The optical component may be configured to apply heat to the recording media to soften the recording media. The magnetic component may be configured to apply a concentrated flux to write data on the heated recording media. By softening the recording media using heat, the optical component enables the magnetic component to more efficiently write data on the recording media. Both magnetic and optical components together enable a higher storage density in the recording media than writer head technologies that do not require a heating element.

Figure 1A:
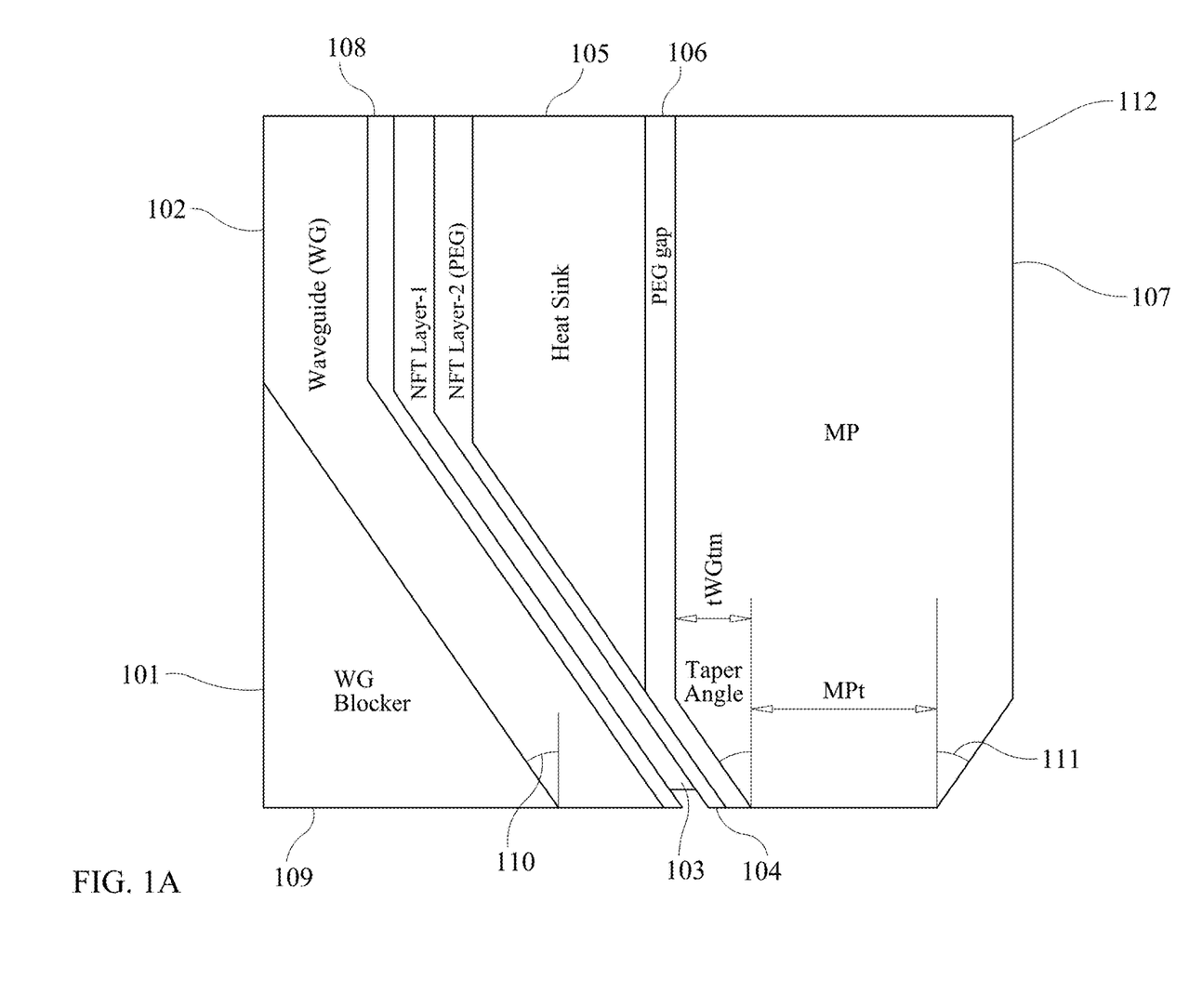
FIGS. 1A and 1B depict illustrative optical components for a writer head in accordance with an embodiment.
Figure 1B:
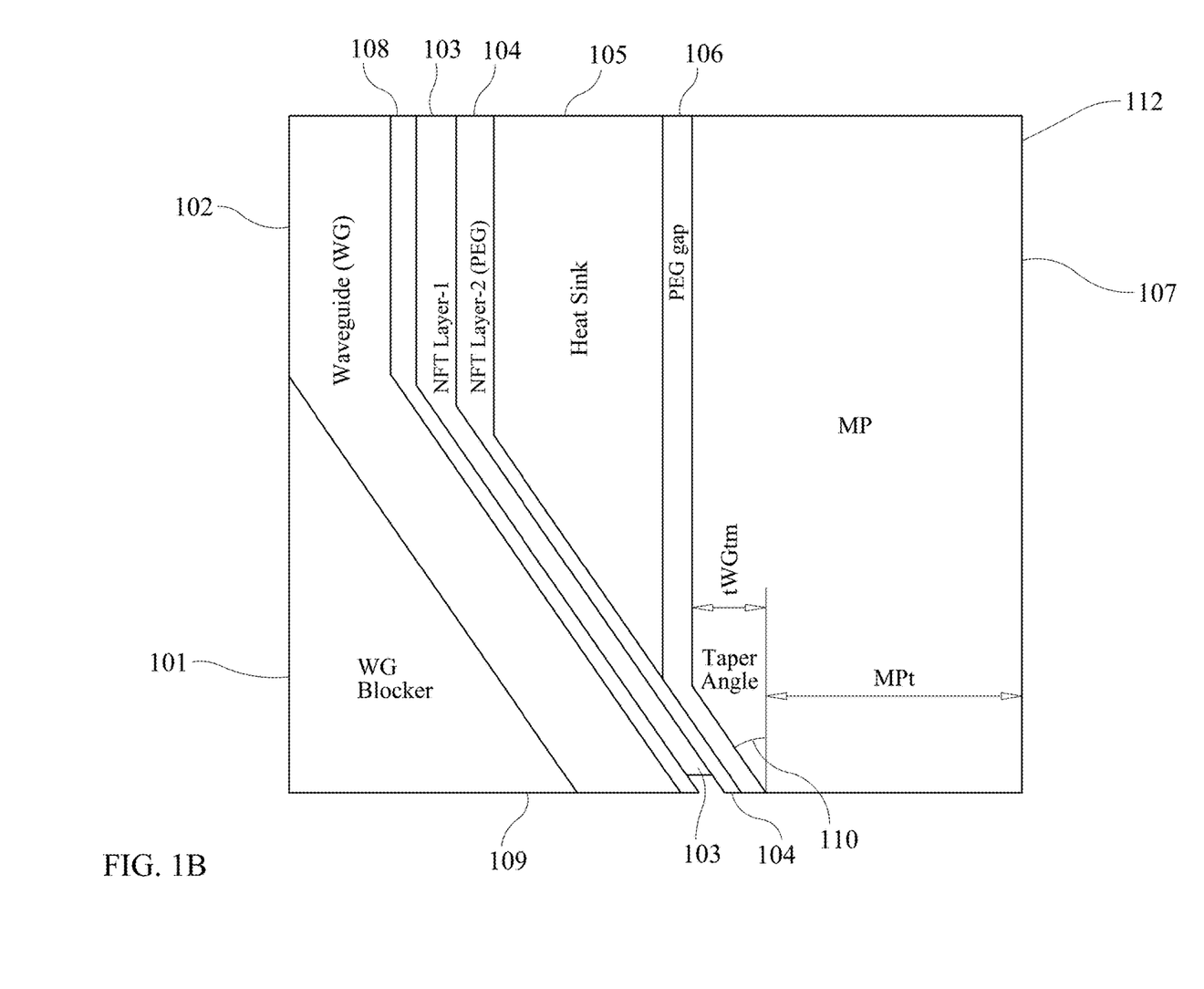
Figure 2A:
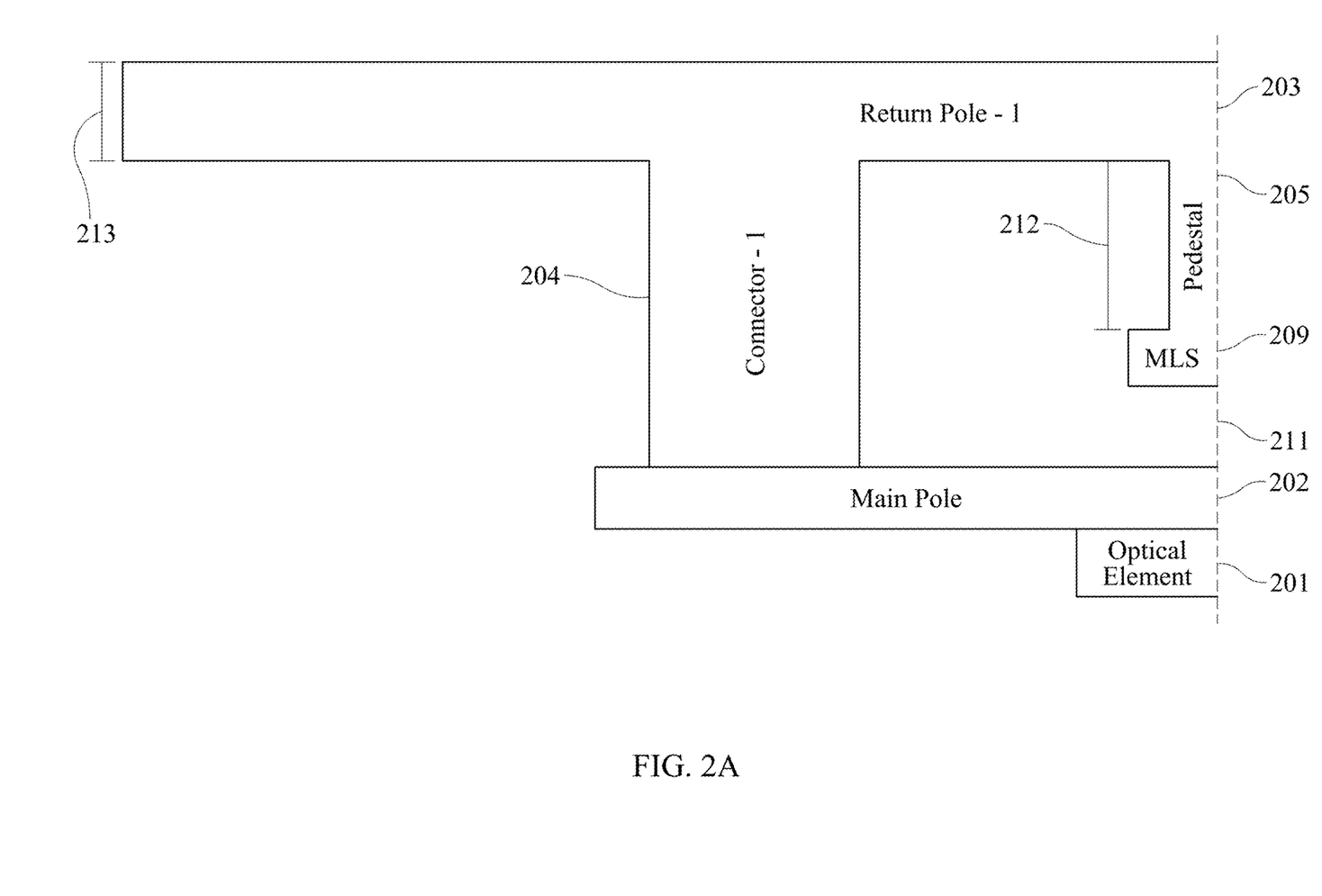
FIGS. 2A-2D depict illustrative writer heads in accordance with an embodiment.
Figure 2B:
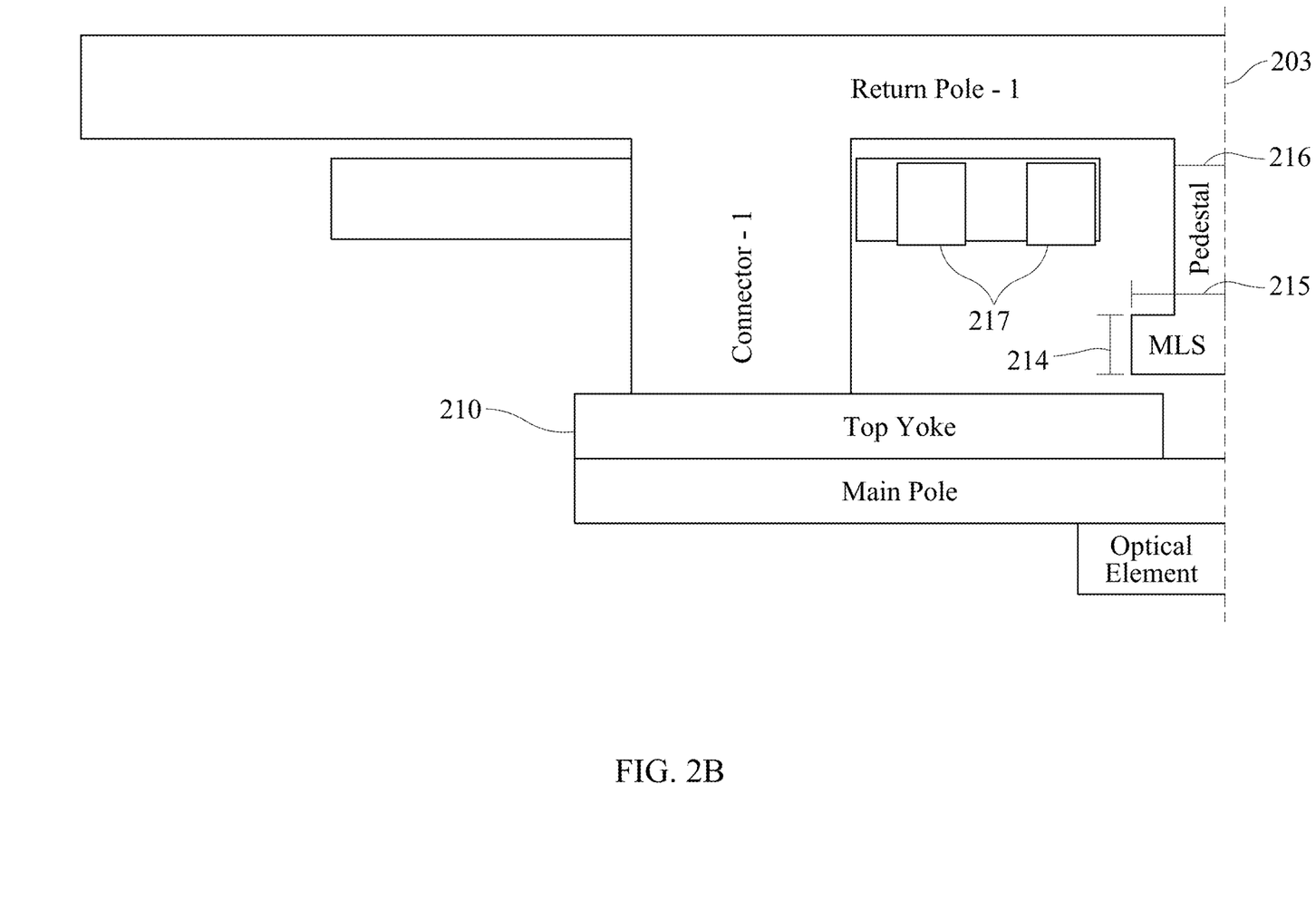
Figure 2C:
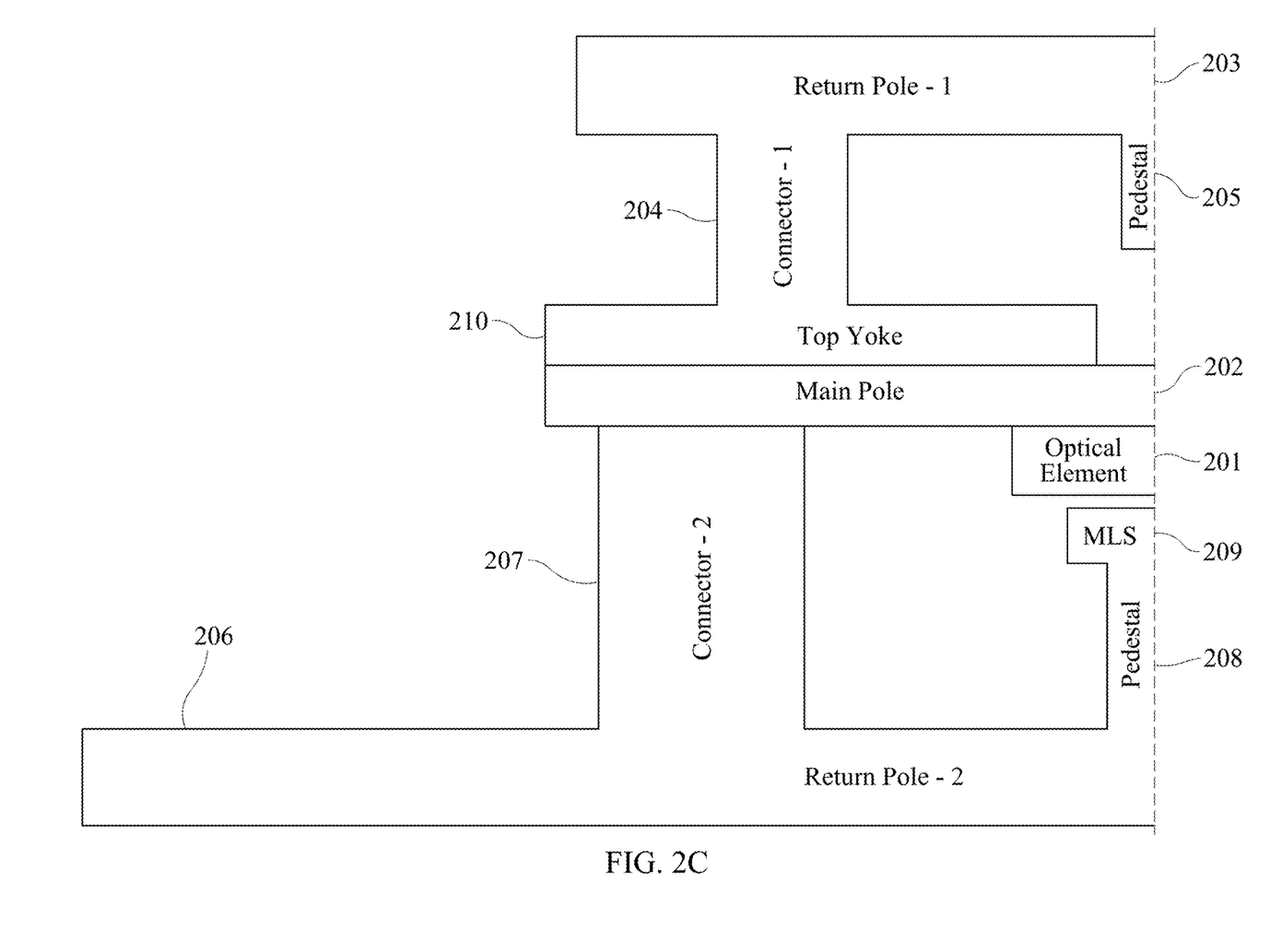
Figure 2D:
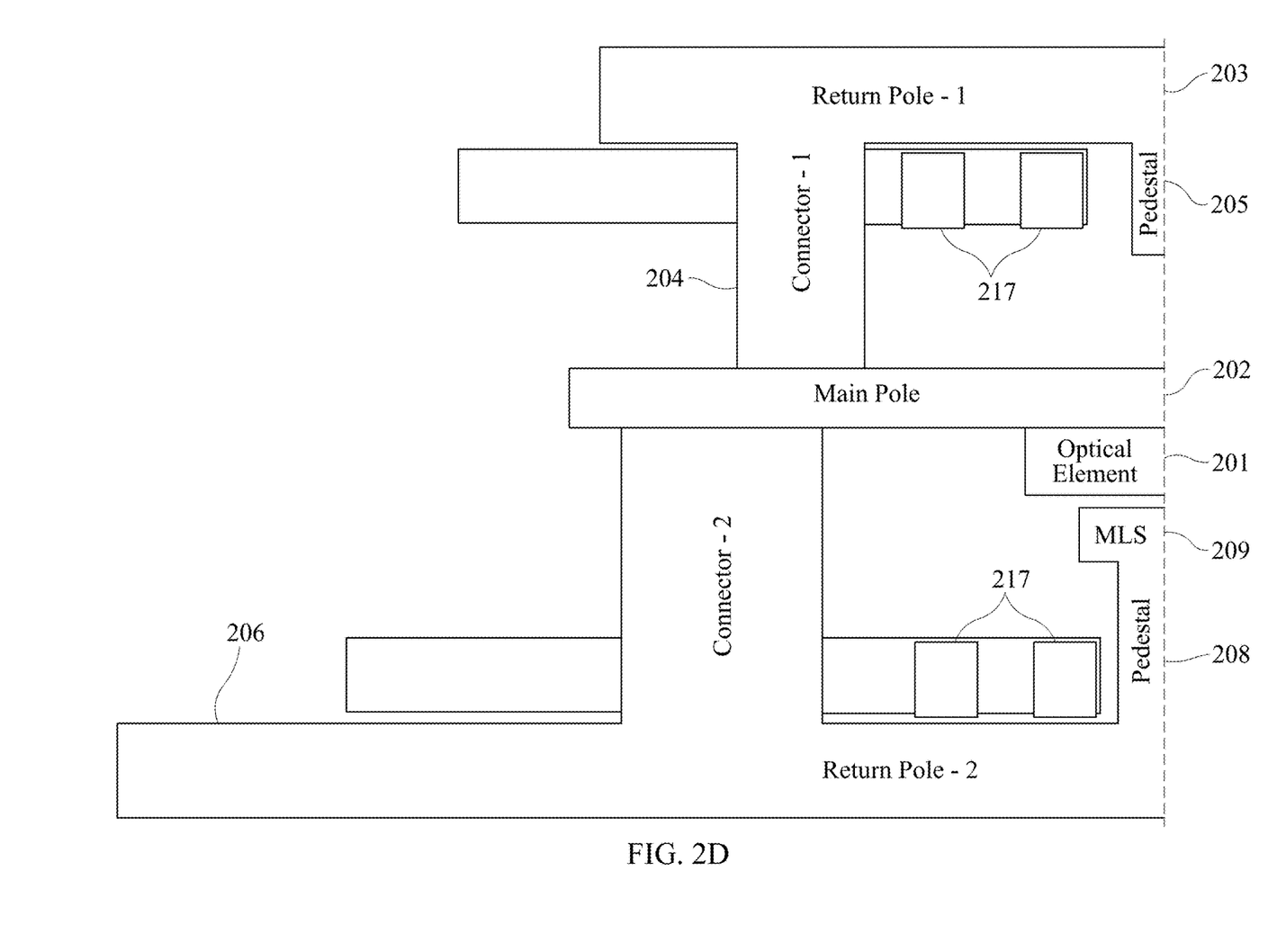

FIGS. 1A and 1B depict illustrative optical components for HAMR writer heads. In some embodiments, the optical component is positioned adjacent to a main magnetic pole 107. In some embodiments, the optical component comprises a laser diode configured to generate a beam of light. In some embodiments, the optical component comprises multiple layers. In some embodiments, the optical component comprises a triangular layer 101 comprising a tapered edge. The triangular layer 101 may be configured to provide a tapered angle 110 to the layers of the optical component and the main magnetic pole 107. In some embodiments, the triangular layer comprises one of alumina or silica. The tapered angle 110 may be any angle effective for generating a target magnetic field. In some embodiments, the tapered angle 110 is about 20 degrees to about 70 degrees depending on the required performances. In some embodiments, the tapered angle is around 45 degrees.

In some embodiments, the triangular layer 101 may be a waveguide (WG) blocker layer. The waveguide blocker layer may be configured to prevent diffused light from reaching a recording media. The waveguide blocking layer may comprise any material that substantially prevents diffused light from reaching the recording media. In some embodiments, the waveguide blocking layer comprises a conductive material such as ruthenium. In some embodiments, the waveguide blocking layer is positioned near an air-bearing surface (ABS) 109.

In some embodiments, the optical component further comprises a waveguide layer 102 positioned adjacent to the triangular layer 101. The waveguide layer 102 may be operably connected to a near field transducer (NFT) layer 103, 104 and configured to direct light from the laser diode to the NFT layer 103, 104. In some embodiments, the waveguide layer 102 comprises a tapered section at an angle that extends to or near the air-bearing surface 109. In some embodiments, the angle of the tapered section is the tapered angle 110 determined by the tapered edge of the triangular layer 101. The waveguide layer 102 may further comprise a flat section substantially parallel to a back part of the main magnetic pole 107. In some embodiments, the waveguide layer 102 comprises a thickness of about 50 nm to about 160 nm. In some embodiments, the waveguide layer comprises a thickness of about 120 nm.

In some embodiments, the thickness of the waveguide layer 102 is expressed as a ratio of the thickness of the waveguide layer 102 to an average grain diameter of a recording media. In some embodiments, the ratio of the thickness of the waveguide layer 102 to the average grain diameter of the recording media is about 7 to about 22.

In some embodiments, the optical component may further comprise a cladding layer 108 positioned between the waveguide layer 102 and the NFT layer 103, 104 and configured to couple the waveguide layer 102 and the NFT layer 103, 104. In some embodiments, the cladding layer 108 is positioned along the entire length of the waveguide layer 102. In some embodiments, the cladding layer 108 is positioned along a portion of the waveguide layer 102. In some embodiments, the cladding layer 108 is positioned near the air-bearing surface 109. The 108 may comprise any material known to be effective for coupling the waveguide layer 102 and the NFT layer 103, 104. In some embodiments, the cladding layer 108 comprises an insulator. In some embodiments, the cladding layer 108 comprises a dielectric material. In some embodiments, the cladding layer 108 comprises a thickness of about 200 nm to about 1 µm. In some embodiments, the cladding layer comprises a thickness of about 400 nm.

In some embodiments, the thickness of the cladding layer 108 is expressed as a ratio of the thickness of the cladding layer 108 to the average grain diameter of a recording media. In some embodiments, the ratio of the thickness of the cladding layer 108 to the average grain diameter of the recording media is about 28 to about 143.

In some embodiments, the optical component further comprises a near field transducer (NFT) layer 103, 104. The NFT layer 103, 104 may be configured to focus laser-induced plasmons onto the recording media. In some embodiments, the NFT layer 103, 104 may be configured to induce heating at a nano-sized point on the recording media to enable magnetic recording on a narrow track and enable high areal density capacity (ADC). In some embodiments, the NFT layer 103, 104 comprises a tapered section at an angle that extends to or near the air-bearing surface 109. In some embodiments, the angle of the tapered section is the tapered angle 110 determined by the tapered edge of the triangular layer 101. The NFT layer 103, 104 may further comprise a flat section substantially parallel to a back part of the main magnetic pole 107. In some embodiments, the NFT layer 103, 104 comprises a thickness of about 17 nm to about 115 nm. In some embodiments, the NFT layer 103, 104 comprises a first NFT layer 103 and a second NFT layer 104.

In some embodiments, the thickness of the NFT layer 103, 104 is expressed as a ratio of the thickness of the NFT layer 103, 104 to an average grain diameter of a recording media. In some embodiments, the ratio of the thickness of the NFT layer 103, 104 to the average grain diameter of the recording media is about 2.5 to about 16.5.

In some embodiments, the first NFT layer 103 comprises a metal with good optical and plasmonic properties. In some embodiments, the first NFT layer 103 comprises one or more of gold, silver, copper, alloys thereof, graphene, and a metal oxide. In some embodiments, the first NFT layer 103 is recessed from the air-bearing surface 109. In some embodiments, the first NFT layer 103 has a thickness of about 15 nm to about 100 nm In some embodiments, the first NFT layer 103 has a thickness of about 55 nm.

In some embodiments, the thickness of the first NFT layer 103 is expressed as a ratio of the thickness of the first NFT layer 103 to an average grain diameter of a recording media. In some embodiments, the ratio of the thickness of the first NFT layer 103 to the average grain diameter of the recording media is about 2 to about 14.

In some embodiments, the second NFT layer 104 comprises a robust transition metal. In some embodiments, the second NFT layer 104 comprises one of rhodium or iridium. In some embodiments, the second NFT layer 104 extends to the air-bearing surface 109. In some embodiments, the second NFT layer 104 has a length of about 0.6 µm to about 1.0 µm. In some embodiments, the second NFT layer 104 has a thickness of about 2 nm to about 15 nm. In some embodiments, the second NFT layer 104 has a thickness of about 5 nm.

In some embodiments, the thickness of the second NFT layer 104 is expressed as a ratio of the thickness of the second NFT layer 104 to the average grain diameter of a recording media. In some embodiments, the ratio of the thickness of the second NFT layer 104 to the average grain diameter of the recording media is about 0.2 to about 2.

The NFT layer 103, 104 may comprises any resistivity effective for focusing laser-induced plasmons onto the recording media. In some embodiments, the NFT layer 103, 104 comprises a resistivity of about 8.0 µΩ *cm to about 20.0 µΩ *cm.

In some embodiments, the optical component further comprises a heat sink layer 105. The heat sink layer 105 may be configured to extract heat from the main magnetic pole 107. The heat sink layer 105 may comprise any material effective for use as a heat sink. In some embodiments, the heat sink layer 105 comprises one or more of gold, ruthenium, aluminum nitride, hexagonal boron nitride, or silicon carbide. In some embodiments, the heat sink layer 105 comprises a tapered section at an angle that extends to or near the air-bearing surface 109. In some embodiments, the angle of the tapered section is the tapered angle 110 determined by the tapered edge of the triangular layer 101. The heat sink layer 105 may further comprise a flat section substantially parallel to a back part of the main magnetic pole 107. In some embodiments, the heat sink layer does not extend to the air-bearing surface 109. In some embodiments, the heat sink layer 105 comprises a thickness of about 10 nm to about 5 µm. In some embodiments, the heat sink layer 105 comprises a thickness of about 100 nm.

In some embodiments, the thickness of the heat sink layer 105 is expressed as a ratio of the thickness of the heat sink layer 105 to an average grain diameter of a recording media. In some embodiments, the ratio of the thickness of the heat sink layer 105 to the average grain diameter of the recording media is about 1.4 to about 500.

In some embodiments, the optical component further comprises a peg layer 106 comprising an insulator and configured to insulate the optical component from the main magnetic pole 107. In some embodiments, the peg layer 106 comprises one of Ir or Rh. In some embodiments, the peg layer 106 extends to the air-bearing surface 109. In some embodiments, the peg layer 106 is configured to separate the NFT layer 103, 104 from the main magnetic pole 107. In such an embodiment, the heat sink layer 105 may be in contact with the main magnetic pole 107. In some embodiments, the peg layer 106 is configured to separate the NFT layer 103, 104 and the heat sink layer 105 from the main magnetic pole 107. In some embodiments, the peg layer 106 comprises a tapered edge comprising the tapered angle 110 determined by the tapered edge of the triangular layer 101.

In some embodiments, the peg layer 106 comprises a thickness of about 15 nm to about 100 nm. In some embodiments, the peg layer 106 comprises a thickness of about 30 nm.

In some embodiments, the thickness of the peg layer 106 is expressed as a ratio of the thickness of the peg layer 106 to an average grain diameter of a recording media. In some embodiments, the ratio of the thickness of the peg layer 106 to the average grain diameter of the recording media is about 2 to about 14.

In some embodiments, the optical component further comprises a first oxide layer positioned between the NFT layer 103, 104 and the heat sink layer 105. In some embodiments, the first oxide layer is positioned along the entire length of the heat sink layer 105. In some embodiments, the first oxide layer is positioned along a portion of the length of the heat sink layer 105. In some embodiments, the first oxide layer comprises one of silica or alumina. In some embodiments, the first oxide layer comprises a thickness of about 1 nm to about 15 nm.

In some embodiments, the thickness of the first oxide layer is expressed as a ratio of the thickness of the first oxide layer to an average grain diameter of a recording media. In some embodiments, the ratio of the thickness of the first oxide layer to the average grain diameter of the recording media is about 0.1 to about 2.

In some embodiments, the optical component further comprises a second oxide layer positioned between the heat sink layer 105 and the peg layer 106. In some embodiments, the second oxide layer is positioned along the entire length of the heat sink layer 105. In some embodiments, the second oxide layer is positioned along a portion of the length of the heat sink layer 105. In some embodiments, the second oxide layer comprises one of silica or alumina. In some embodiments, the second oxide layer comprises a thickness of about 1 nm to about 15 nm.

In some embodiments, the thickness of the second oxide layer is expressed as a ratio of the thickness of the second oxide layer to an average grain diameter of a recording media. In some embodiments, the ratio of the thickness of the second oxide layer to the average grain diameter of the recording media is about 0.1 to about 2.

The main magnetic pole 107 may be configured to apply a concentrated flux to the recording media. The main magnetic pole 107 may comprise any saturation magnetization effective for writing data on the recording media. Typically the material for the main pole is the highest saturation magnetization material available. In some embodiments, the main magnetic pole 107 comprises a material with a magnetic moment greater than about 24 kG. In some embodiments, the main magnetic pole 107 comprises a bi-layer material consisting of a 24 kG material and another thermally robust material with a lower magnetic moment in the range of 16 to 22 kG. In some embodiments, the high-moment material is placed near the NFT to achieve a higher magnetic flux concentration. In some embodiments, the lower moment material is placed near the NFT to achieve a better lifetime.

In some embodiments, the main magnetic pole 107 comprises a first tapered section comprising the tapered angle 110. In some embodiments, the first tapered section extends from near the air-bearing surface 109 to the air-bearing surface 109. In some embodiments, the thickness of the first tapered section is about 10 nm, about 100 nm. In some embodiments, the thickness of the first tapered section is about 40 nm.

In some embodiments, the thickness of the first tapered section is expressed as a ratio of the thickness of the first tapered section to an average grain diameter of a recording media. In some embodiments, the ratio of the thickness of the first tapered section to the average grain diameter of the recording media is about 1.4 to about 14.

In some embodiments, the main magnetic pole 107 further comprises a main magnetic pole section extending along the air-bearing surface 109. In some embodiments, the main magnetic pole section comprises a thickness of about 200 nm about 600 nm. In some embodiments, the main magnetic pole section comprises a thickness of about 300 nm.

In some embodiments, the thickness of the main magnetic pole section is expressed as a ratio of the thickness of the main magnetic pole section to an average grain diameter of a recording media. In some embodiments, the ratio of the thickness of the main magnetic pole section to the average grain diameter of the recording media is about 29 to about 86.

In some embodiments, the back edge 112 of the main magnetic pole 107 is flat and does not comprise a second tapered section. In some embodiments, the back edge 112 of the main magnetic pole 107 comprises a second tapered section comprising a second tapered angle 111. The second tapered angle 111 may be any angle effective for generating a target magnetic field. In some embodiments, the second tapered angle 111 is about 20 degrees to about 70 degrees. In some embodiments, the second tapered angle 111 comprises the same angle as the tapered angle 110. In some embodiments, the thickness of the second tapered section is the same as the thickness of the first tapered section. In some embodiments, the second tapered section comprises a thickness of about 20 nm to about 100 nm. In some embodiments, the second tapered section comprises a thickness of about 40 nm.

In some embodiments, the thickness of the second tapered section is expressed as a ratio of the thickness of the second tapered section to an average grain diameter of a recording media. In some embodiments, the ratio of the thickness of the second tapered section to the average grain diameter of the recording media is about 1.4 to about 14.

FIGS. 2A-2D depicts illustrative writer heads for HAMR devices. In some embodiments, the writer head comprises an optical component 201. The optical component may be any optical component 201 described above. The optical component 201 may be positioned adjacent to a main magnetic pole 202. In some embodiments, the optical component 201 is positioned on the bottom of the main magnetic pole 202. The main magnetic pole 202 may be the main magnetic pole 107 described above. In some embodiments, the optical component 201 and the main magnetic pole 202 extend to an air-bearing surface 211. In some embodiments, the writer head comprises a first return pole 203 configured to enable the flux from the main magnetic pole 202 to complete a loop. In some embodiments, the first return pole 203 extends to the air-bearing surface 211.

The distance between the main magnetic pole 202 and the first return pole 203 may be selected to maximize the magnetic field at a recording point on the recording media. In some embodiments, the first return pole 203 is positioned on a side of the main magnetic pole 202 opposite the optical component 201. In such embodiments, the distance between the first return pole 203 and the main magnetic pole 202 is not limited by the optical component 201. In some embodiments, the distance between the main magnetic pole 202 and the first return pole 203 is about 50 nm to about 1,000 nm.

In some embodiments, the distance between the main magnetic pole 202 and the first return pole 203 is about 500 nm.

The first return pole 203 may have any thickness 213 effective for enabling the flux from the main magnetic pole 202 to complete a loop. In some embodiments, the first return pole 203 comprises a thickness 213 of about 500 nm to about 1,500 nm. In some embodiments, the first return pole 203 comprises a magnetic material with a saturation magnetization lower than that of the main magnetic pole 202. In some embodiments, the first return pole 203 comprises a saturation magnetization of about 10 kG to about 22 kG. In some embodiments, the first return pole 203 comprises a saturation magnetization of about 19 kG.

In some embodiments, the first return pole 203 comprises a first pedestal 205 configured to determine the distance between the first return pole 203 and the main magnetic pole 202. In some embodiments, the first pedestal 205 is positioned adjacent to the air-bearing surface 211. In some embodiments, the first pedestal 205 has a thickness 212 of about 1.5 μm to about 2.5 μm. In some embodiments, the first pedestal 205 has a thickness 212 of about 1 μm. In some embodiments, the first pedestal 205 has a height 216 of about 200 nm to about 1,000 nm. In some embodiments, the first pedestal 205 has a height 216 of about 300 nm. In some embodiments, the first pedestal 205 comprises a magnetic material with a saturation magnetization lower than that of the main magnetic pole 202. In some embodiments, the first pedestal 205 comprises a saturation magnetization about 10 kG to about 22 kG. In some embodiments, the first pedestal 205 comprises a saturation magnetization of about 19 kG.

In some embodiments, the first return pole 203 comprises a magnetic leading shield (MLS) 209 positioned adjacent to the air-bearing surface 211. In some embodiments, the magnetic leading shield 209 has a thickness 214 of about 0.1 μm to about 1 μm, with a nominal value of around 0.5 μm. In some embodiments, the magnetic leading shield 209 has a height 215 of about 0.5 μm to about 2.0 μm. In some embodiments, the magnetic leading shield 209 has a height 215 of about 0.8 μm.

In some embodiments, the first return pole 203 may be operably connected to the main magnetic pole 202 by a first connector 204. In some embodiments, the first connector 204 comprises a magnetic material with a saturation magnetization lower than that of the main magnetic pole 202. In some embodiments, the first connector 204 comprises a saturation magnetization of about 10 kG to about 22 kG. In some embodiments, the first connector 204 comprises a saturation magnetization of about 19 kG.

In some embodiments, the main magnetic pole 202 further comprises a top yoke 210 configured to assist in controlling the flux concentration on the back of the main magnetic pole 202. In some embodiments, the top yoke 210 is recessed from the air-bearing surface 211. In some embodiments, the top yoke 210 comprises a magnetic material with a saturation magnetization lower than that of the main magnetic pole 202. In some embodiments, the top yoke 210 comprises a saturation magnetization of about 10 kG to about 22 kG. In some embodiments, the top yoke 210 comprises a saturation magnetization of about 19 kG. In some embodiments, the first return pole 203 is operably connected to the top yoke 210 by the first connector 204.

In some embodiments, the writer head further comprises at least one coil 217 configured to conduct a current and provide a magnetomotive force to the writer head. In some embodiments, the at least one coil 217 is positioned between the optical component 201 and the first return pole 203. The at least one coil may comprise any number of loops effective for providing a magnetomotive force to the writer head. In some embodiments, at least one coil 217 comprises loops numbering from 1 to 6.

In some embodiments, the writer head comprises a second return pole 206 configured to enable the flux from the main magnetic pole 202 to complete a loop. In some embodiments, the second return pole 206 extends to the air-bearing surface 211. The distance between the main magnetic pole 202 and the second return pole 206 may be selected to maximize the magnetic field at a recording point on the recording media. In some embodiments, the second return pole 206 is positioned on the same side of the main magnetic pole 202 as the optical component 201. In such embodiments, the distance between the second return pole 206 and the main magnetic pole 202 is limited by the optical component 201. In some embodiments, the distance between the main magnetic pole 202 and the second return pole 206 is about 100 nm to about 2,000 nm. In some embodiments, the distance between the main magnetic pole 202 and the second return pole 206 is about 800 nm.

The second return pole 206 may have any thickness effective for enabling the flux from the main magnetic pole 202 to complete a loop. In some embodiments, the thickness of the second return pole 206 is limited by the position of the optical component 201. In some embodiments, the second return pole 206 has a thickness of about 100 nm to about 1,500 nm. In some embodiments, the second return pole 206 has a thickness of about 500 nm. In some embodiments, the second return pole 206 comprises a magnetic material with a saturation magnetization lower than that of the main magnetic pole 202. In some embodiments, the second return pole 206 comprises a saturation magnetization of about 10 kG to about 22 kG. In some embodiments, the second return pole 206 comprises a saturation magnetization of about 19 kG.

In some embodiments, the second return pole 206 comprises a second pedestal 208 configured to determine the distance between the second return pole 206 and the main magnetic pole 202. In some embodiments, the second pedestal 208 is positioned adjacent to the air-bearing surface 211. In some embodiments, the second pedestal 208 has a thickness of about 1.5 μm to about 2.5 μm. In some embodiments, the second pedestal 208 has a thickness of about 2 μm. In some embodiments, the second pedestal 208 has a height of about 200 nm to about 1,000 nm. In some embodiments, the second pedestal 208 has a height of about 500 nm. In some embodiments, the second pedestal 208 comprises a magnetic material with a saturation magnetization lower than that of the main magnetic pole 202. In some embodiments, the second pedestal 208 comprises a saturation magnetization of about 10 kG to about 22 kG. In some embodiments, the second pedestal 208 comprises a saturation magnetization of about 19 kG.

In some embodiments, the second return pole 206 comprises a magnetic leading shield (MLS) 209 positioned adjacent to the air-bearing surface 211. In some embodiments, the magnetic leading shield 209 has a thickness of about 0.1 μm to about 0.8 μm. In some embodiments, the magnetic leading shield 209 has a thickness of about 0.5 μm. In some embodiments, the magnetic leading shield 209 has a height of about 0.5 μm to about 1.0 μm. In some embodiments, the magnetic leading shield 209 has a height of about 0.8 μm.

In some embodiments, the second return pole 206 may be operably connected to the main magnetic pole 202 by a second connector 207. In some embodiments, the second connector 207 comprises a magnetic material with a saturation magnetization lower than that of the main magnetic pole 202. In some embodiments, the second connector 207 comprises a saturation magnetization of about 10 kG to about 22 kG. In some embodiments, the second connector 207 comprises a saturation magnetization of about 19 kG.

In such embodiments wherein the writer head comprises a first return pole 203 and a second return pole 206 the writer head may comprise at least one coil 217 positioned between the first return pole 203 and the main magnetic pole 202 and at least one coil 217 positioned between the second return pole 206 and the main magnetic pole 202. In some embodiments, the total number of loops between the first return pole 203 and the main magnetic pole 202 and between the second return pole 206 and the main magnetic pole 202 is the same. In some embodiments, the writer head comprises a total number of loops from 1 to 6.

Methods

Methods may be performed to manufacture the above-described optical components for HAMR writer heads.

A method for manufacturing an optical component for a HAMR writer head comprises providing a substrate, depositing a triangular layer on the surface of the substrate, and depositing each subsequent layer of the optical component. Each layer may be deposited by any method known to one of skill in the art. In some embodiments, the method comprises depositing each layer by one of sputter deposition, physical vapor deposition, chemical vapor deposition, plating, or electron beam evaporation. Each layer may be deposited to a thickness greater than or equal to the desired thickness of the corresponding layer.

The method may further comprise surface treating each layer before the deposition of the next layer. In some embodiments, the surface of each layer is treated to reach a desired thickness and shape. In some embodiments. In some embodiments, the surface treating comprises one or more of etching, polishing, milling, laser ablation, or combinations of the above. In some embodiments, the surface treating comprises creating a smooth surface. In some embodiments, the surface of the one or more of the layers is treated to create a tapered section comprising a tapered edge. In some embodiments, the tapered edge has an angle of about 20 degrees to about 70 degrees. In some embodiments, the tapered edge has an angle of about 45 degrees. In some embodiments, the surface may be treated to control the position of the layer relative to an air-bearing surface.

The method may further comprise operably connecting a magnetic main pole to the optical component. In some embodiments, the magnetic main pole is deposited on the optical component. The magnetic main pole may be deposited by any method known to one of skill in the art. In some embodiments, the magnetic main pole is deposited by one of sputter deposition, physical vapor deposition, chemical vapor deposition, plating, or electron beam evaporation. The magnetic main pole may be deposited to a thickness greater than or equal to the desired thickness of the final product. The magnetic main pole may be deposited such that the surface of the pole contacting the optical component comprises a tapered edge. In some embodiments, the tapered edge has an angle of about 20 degrees to about 70 degrees. In some embodiments, the tapered edge has an angle of about 45 degrees.

In some embodiments, the method further comprises surface treating the surface of the magnetic main pole opposite the optical component to create a second tapered edge. In some embodiments, the second tapered edge may have an angle of about 20 degrees to about 70 degrees. In some embodiments, the second tapered edge has an angle of about 45 degrees. In some embodiments, the method further comprises surface treating the surface of the magnetic main pole opposite the optical component to create a flat surface.

EXAMPLES

Example 1: Magnetic Field Testing

Figure 3:
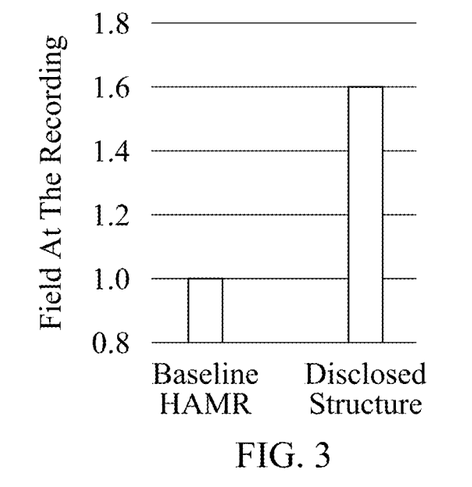
FIGS. 3-5 depict graphical representations of the performance metrics of writer heads in accordance with an embodiment.
Figure 4:
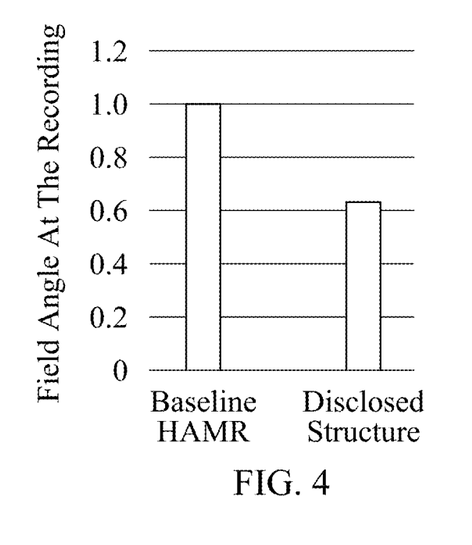
Figure 5:
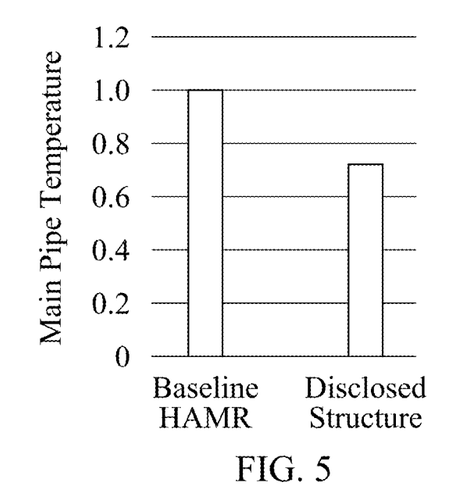

The magnetic and thermal properties of the HAMR writer head as described in the disclosure herein were compared against an existing HAMR writer head design. The properties were compared using modeling and simulation results on the magnetic field at the recording location, the magnetic field angle at the recording location, and the temperature of the main pole during recording. Graphical representations of the results of the testing are provided in FIGS. 3-5. The HAMR writer head with the tapered main magnetic pole had a 60% higher magnetic field at the recording than the existing HAMR writer head and a 40% lower magnetic field angle at the recording than the existing HAMR writer head. These improvements show that the tapered main pole provides a significant increase in the areal density capacity of the HAMR. Furthermore, the HAMR writer head with the tapered main magnetic pole had a 30% lower temperature at the main magnetic pole during recording than the existing HAMR writer head. This shows that the HAMR writer head with the tapered main magnetic pole has a more reliable and precise magnetic field than the existing HAMR writer head.

CONCLUSION

As used herein, the term "about," when immediately preceding a numerical value, means a range of plus or minus 10% of that value; for example, "about 50" means 45 to 55, "about 25,000" means 22,500 to 27,500, etc., unless the context of the disclosure indicates otherwise, or is inconsistent with such an interpretation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure and those enumerated herein will be evident to those skilled in the art from the descriptions. Such modifications and variations are intended to fall within the scope of the appended claims. The present disclosure is limited only by the terms of the appended claims and the full scope of equivalents to which such claims are entitled. It is to be understood that this disclosure is not limited to particular methods, reagents, compounds, compositions, or biological systems, which can, of course, vary. It is also to be understood that the terminology used herein describes particular embodiments only and is not intended to be limiting.

As used in this document, the singular forms "a," "an," and "the" include plural references unless the context dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by prior invention. As this document uses, "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Concerning the use of substantially any plural and singular terms herein, those having skill in the art can translate from the plural to the singular and from the singular to the plural as is appropriate to the context and application. The various singular/plural permutations may be expressly set forth herein for clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may use the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and "an" should be interpreted to mean "at least one" or "one or more"); the same holds for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, implies at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and A, B, and C together, etc.). It will be further understood by those within the art that virtually any disjunctive word and phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also described in terms of any individual member or subgroup of members of the Markush group.

As will be understood by one skilled in the art, for any purposes, such as providing a written description, all ranges disclosed herein also encompass any possible subranges and combinations thereof. Any listed range can be easily recognized as sufficiently describing and enabling the same range to be broken down into at least equal halves, thirds, quarters, fifths, tenths, etc. As a non-limiting example, each range discussed herein can be readily broken down into a lower third, middle third, upper third, etc. As will also be understood by one skilled in the art, all languages such as "up to," "at least," and the like include the number recited and refer to ranges that can be broken down into subranges as discussed above. Finally, as will be understood by one skilled in the art, a range includes each member. Thus, for example, a group with 1-3 cells refers to groups with 1, 2, or 3 cells. Similarly, a group having 1-5 cells refers to groups having 1, 2, 3, 4, or 5 cells, and so forth.

What is claimed is:

1. A writer head for a heat-assisted magnetic recording (HAMR) device, the writer head comprising:
    an optical component including a triangular layer having a tapered edge and a waveguide (WG) layer positioned adjacent to the triangular layer, the WG layer including a flat section and a tapered section, the tapered section including a tapered angle and contacting the tapered edge of the triangular layer;
    a cladding layer positioned adjacent to the WG layer;
    a near field transducer (NFT) layer positioned adjacent to the cladding layer, the NFT layer including a tapered section that includes the tapered angle;
    a heat sink layer positioned adjacent to the NFT layer; and
    a peg layer positioned adjacent to the heat sink layer and comprising an insulator and a tapered section comprising the tapered angle; and
    a magnetic component that includes a magnetic main pole having a first tapered section comprising the tapered angle, a main pole section substantially parallel to the flat section of the WG layer, and wherein the magnetic main pole has a saturation magnetization of about 24 kG or greater.

2. The writer head of claim 1, wherein the tapered angle is about 20 degrees to about 70 degrees.

3. The writer head of claim 1, wherein the triangular layer includes a waveguide blocking layer comprising ruthenium.

4. The writer head of claim 1, wherein the triangular layer includes one or more of alumina or silica.

5. The writer head of claim 1, wherein the NFT layer includes a first NFT layer includes a first metal and a second NFT layer that includes a transition metal,
    wherein the first NFT layer includes one or more of gold, silver, copper, alloys thereof, graphene, and a metal oxide; and
    wherein the second NFT layer includes one of Rh or Ir.

6. The writer head of claim 1, wherein the heat sink layer includes one or more of gold, ruthenium, aluminum nitride, or silicon carbide.

7. The writer head of claim 1, wherein the optical component further includes a first oxide layer positioned between the NFT layer and the heat sink layer.

8. The writer head of claim 1, wherein the tapered section of the main magnetic pole includes the tapered angle.

9. The writer head of claim 1, wherein the first tapered section of the main magnetic pole has a thickness of about 20 nm to about 100 nm.

10. The writer head of claim 1, wherein the ratio of the thickness of the first tapered section of the main magnetic pole to an average grain diameter of a recording media is about 1.4 to about 14.

11. The writer head of claim 1, wherein the main pole section has a thickness of about 200 nm to about 600 nm.

12. The writer head of claim 1, wherein the ratio of the thickness of the main pole section of the main magnetic pole to an average grain diameter of a recording media is about 29 to about 86.

13. The writer head of claim 1, wherein the main magnetic pole includes a second tapered section comprising the same tapered angle as the first tapered section.

14. The writer head of claim 13, wherein the second tapered section of the main magnetic pole has a thickness of about 20 nm to about 100 nm.

15. The writer head of claim 13, wherein the ratio of the thickness of the second tapered section of the main magnetic pole to an average grain diameter of a recording media is about 1.4 to about 14.

16. The writer head of claim 1, wherein the optical component further includes a laser diode configured to generate a beam of light.

17. The writer head of claim 1, wherein the magnetic component includes a first return pole operably connected to the main magnetic pole by a first connector and positioned on a side of the main magnetic pole opposite of the optical component.

18. The writer head of claim 17, wherein the distance between the first return pole and the main magnetic pole is about 50 nm to about 1,000 nm.

19. The writer head of claim 17, wherein the first return pole has a thickness of about 500 nm to about 1,500 nm.

20. The writer head of claim 17, wherein the first return pole includes a first pedestal with a thickness of about 1.5 µm to about 2.5 µm and a height of about 200 nm to about 1,000 nm.

21. The writer head of claim 17, wherein the first return pole further includes a first magnetic leading shield (MLS) comprising a thickness of about 100 nm to about 1,000 nm and a height of about 500 nm to about 2,000 nm.

22. The writer head of claim 17, wherein the magnetic component includes a first yoke positioned between the first connector and the main magnetic pole.

23. The writer head of claim 17, wherein the magnetic component includes a second return pole operably connected to the main magnetic pole by a second connector and positioned on a side of the main magnetic pole opposite of the first return pole.

24. The writer head of claim 23, wherein the distance between the second return pole and the main magnetic pole is about 100 nm to about 2,000 nm.

25. The writer head of claim 23, wherein the second return pole has a thickness of about 100 nm to about 1,500 nm.

26. The writer head of claim 23, wherein the second return pole includes a second pedestal with a thickness of about 1.5 µm to about 2.5 µm and a height of about 200 nm to about 1,000 nm.

27. The writer head of claim 23, wherein the second return pole further includes a second magnetic leading shield (MLS) comprising a thickness of about 100 nm to about 800 nm and a height of about 500 nm to about 1,000 nm.

28. The writer head of claim 17, wherein the magnetic component further includes a coil comprising between 0 and 6 loops, wherein the coil is positioned between the first return pole and the main magnetic pole.

29. The writer head of claim 23, wherein the magnetic component further includes a first coil and a second coil, wherein the first coil and the second coil combined comprise between 0 and 6 loops, wherein the first coil is positioned between the first return pole and the main magnetic pole, wherein the second coil is positioned between the second return pole and the main magnetic pole, and wherein the first coil and the second coil comprise the same number of loops.

* * * * *